United States Patent
Zollner et al.

(10) Patent No.: US 11,250,832 B2
(45) Date of Patent: Feb. 15, 2022

(54) FEEDFORWARD ACTIVE NOISE CONTROL

(71) Applicant: Harman Becker Automotive Systems GmbH, Karlsbad (DE)

(72) Inventors: Juergen Zollner, Straubing (DE); Markus Christoph, Straubing (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 16/976,017

(22) PCT Filed: Feb. 27, 2018

(86) PCT No.: PCT/EP2018/054811
§ 371 (c)(1),
(2) Date: Aug. 26, 2020

(87) PCT Pub. No.: WO2019/166075
PCT Pub. Date: Sep. 6, 2019

(65) Prior Publication Data
US 2021/0104218 A1     Apr. 8, 2021

(51) Int. Cl.
*G10K 11/178* (2006.01)
*H04R 3/04* (2006.01)
*B60R 11/02* (2006.01)

(52) U.S. Cl.
CPC .. *G10K 11/17854* (2018.01); *G10K 11/17817* (2018.01); *G10K 11/17823* (2018.01); *G10K 11/17857* (2018.01); *G10K 11/17883* (2018.01); *H04R 3/04* (2013.01); *B60R 11/0217* (2013.01); *B60R 11/0247* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 5,347,586 | A | 9/1994 | Hill et al. |
| 5,388,080 | A | 2/1995 | Feintuch et al. |
| 5,701,350 | A | 12/1997 | Popovich |
| 5,852,667 | A | 12/1998 | Pan et al. |
| 7,088,828 | B1 | 8/2006 | Bradford et al. |
| 2007/0086598 | A1 | 4/2007 | Da Callafon |
| 2010/0014685 | A1 | 1/2010 | Wurm |

FOREIGN PATENT DOCUMENTS

GB   2470679 A   1/2010

OTHER PUBLICATIONS

ISA European Patent Office, International Search Report and Written Opinion Issued in Application No. PCT/EP2018/054811, dated Nov. 15, 2018, WIPO, 15 pages.

*Primary Examiner* — James K Mooney
(74) *Attorney, Agent, or Firm* — McCoy Russell LLP

(57) ABSTRACT

Sound reduction includes receiving a reference signal corresponding to undesired sound present in the target space, and producing, based on the reference signal, a cancelling signal representative of the undesired sound present in the target space. Sound reduction further includes producing, based on the cancelling signal, sound to destructively interfere with the undesired sound present in the target space, and delaying at least one of the reference signal and the cancelling signal to reduce or compensate for runtime differences between signal paths that transfer the reference signal to the target space.

20 Claims, 5 Drawing Sheets

FEEDFORWARD ACTIVE NOISE CONTROL

CROSS-REFERENCE TO RELATED APPLICATIONS

The present application is a U.S. National Phase of International Patent Application Serial No. PCT/EP2018/054811 entitled "FEEDFORWARD ACTIVE NOISE CONTROL," filed on Feb. 27, 2018. The entire contents of each of the above-referenced applications are hereby incorporated by reference for all purposes.

FIELD

The disclosure relates to active noise control systems and methods (generally referred to as systems), and more specifically to feedforward active noise control systems and methods.

BACKGROUND

Active noise control (ANC) is used to generate sound waves that destructively interfere with undesired sound waves. The destructively interfering sound waves may be produced by a transducer, such as a loudspeaker, to combine with the undesired sound waves. Different types of ANC structures such as feedback structures, feedforward structures and combinations thereof exist. A feedforward ANC system picks up undesired sound to be cancelled, such as noise, by means of a reference sensor, such as a microphone disposed close to a noise source, and generates based thereon an anti-noise signal that the loudspeaker reproduces in a target space where the noise is to be cancelled. A feedback ANC system only uses an error sensor, such as a microphone disposed in a target space, and thus cancels only predictable noise components of the primary noise. Feedforward ANC structures such as, for example, ANC structures that are based on standard least-mean-square (LMS) algorithms and supported by adequate hardware commonly require considerable computing power. Therefore, a need exists to reduce the computing power of feedforward ANC structures.

SUMMARY

An automatic noise control system includes a reference input path configured to receive a reference signal corresponding to undesired sound present in a target space, and an active noise controller operatively coupled with the reference input path and configured to produce from the reference signal a cancelling signal for cancelling the undesired sound present in the target space. The system further includes a transducer operatively coupled with the active noise controller and configured to produce, based on the cancelling signal, sound to destructively interfere with the undesired sound present in the target space, and at least one delay element operatively coupled with the active noise controller and configured to delay at least one of the reference signal and the cancelling signal to reduce runtime differences between one or more signal paths that transfer the undesired sound and one or more signal paths that transfer the reference signal to the target space.

A sound reduction method includes receiving a reference signal corresponding to undesired sound present in a target space, and producing, based on the reference signal, a cancelling signal for cancelling the undesired sound present in the target space. The method further includes producing, based on the cancelling signal, sound to destructively interfere with the undesired sound present in the target space, and delaying at least one of the reference signal and the cancelling signal to reduce runtime differences between one or more signal paths that transfer the undesired sound and one or more signal paths that transfer the reference signal to the target space.

Other systems, methods, features and advantages will be, or will become, apparent to one with skill in the art upon examination of the following detailed description and appended figures. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures (FIG) are not necessarily to scale, emphasis instead being placed upon illustrating principles of the disclosure. Moreover, in the figures, like referenced numerals designate corresponding parts throughout the different views.

DETAILED DESCRIPTION

Undesired sound is any sound that is annoying to a listener such as all kinds of noise including vehicle engine sound, road noise etc., but it can also be music or speech of others when, for example, the listener wants to make a telephone call. However, music or speech can be a desired sound if the listener wants to listen to it. Other types of desired sound may be acoustic warning signals or even vehicle engine sound if it serves as feedback information for a driver operating the vehicle. For the purposes herein, undesired sound is sound that is to be cancelled and desired sound is sound that is not to be cancelled.

Figure 1:
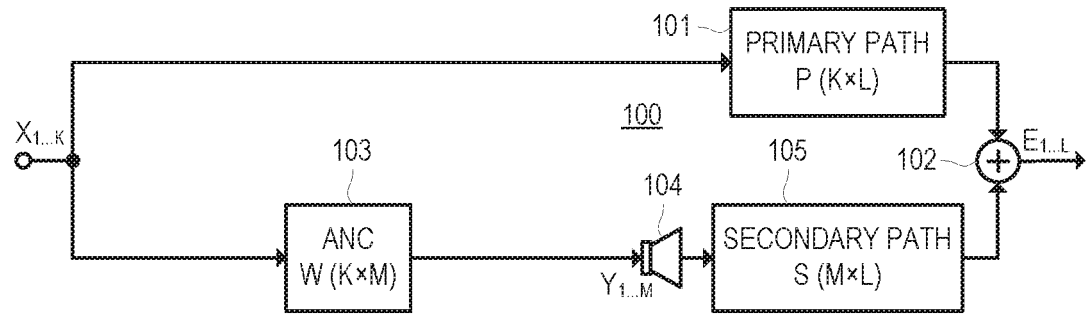
FIG. 1 is a schematic diagram illustrating an exemplary basic multi-channel automatic noise control system of the feedforward type with an ANC filter.

Referring now to FIG. 1, an example basic feedforward ANC system 100 and an example physical environment are represented through a block diagram format. In one example, undesired sound represented by K≥1 frequency (or subband or time) domain reference signals $X_{1...K}$, wherein K is an integer, may traverse physical paths, referred to as K·L acoustic primary paths 101, from each of K sources (not shown) of the reference signals $X_{1...K}$ to each of L≥1 error sensors, e.g., microphones 102 represented in the drawings by summing nodes, that produce L frequency (or subband or time) domain error signals $E_{1...L}$, wherein L is an integer. The K·L primary paths 101 have frequency-domain transfer functions P, with which the reference signals $X_{1...K}$ are filtered. The reference signals $X_{1...K}$ represent the undesired sound both physically and digitally, wherein a digital representation may be produced through use of an analog-to-digital (A/D) converter. The reference signals $X_{1...K}$ are also used as inputs to a matrix of K·M ANC filters 103. The ANC filters 103 have frequency-domain transfer functions W and may be, for example, appropriate digital filters such as finite impulse response (FIR) filters or any other appropriate type of filters, each configured to be dynamically adapted to filter a corresponding one of reference signals $X_{1...K}$ in order to produce M≥1 anti-noise signals $Y_{1...M}$ as an output, wherein M is an integer.

The anti-noise signals $Y_{1...M}$ drive M transducers (actuators), e.g., loudspeakers 104, which output corresponding sound waves that travel M·L physical paths, referred to as acoustic secondary paths 105, which extend from each of the loudspeakers 104 to each of the microphones 102. The secondary paths 105 in the example system shown in FIG. 1 have frequency domain transfer functions S. The sound waves produced by the loudspeakers 104 based on the anti-noise signals $Y_{1...M}$ are filtered with the transfer functions S, and then combined (added) with the signals from the primary paths 101 to form inputs into the microphones 102 which are, therefore, represented by summing nodes that perform summation operations in the example system shown in FIG. 1 to produce the input signals for the microphones 102, which are transformed into the error signals $E_{1...L}$. The ANC filters 103 may be adaptive filters or, as the case may be, fix filter whose transfer functions W are adapted or adjusted to produce, based on the reference signals $X_{1...K}$, the anti-noise signals $Y_{1...M}$. The anti-noise signals $Y_{1...M}$ are, after being broadcasted by the loudspeakers 103 and transferred (filtered) with the transfer functions S, the inverse of the reference signals $X_{1...K}$ after being transferred (filtered) with the transfer functions P of the primary paths 101. Thus, at the microphone 102 two different (groups of) signals appear that refer back to the undesired sound or its representation, i.e., the reference signal, but are transferred via different signals paths, i.e., primary path(s) and secondary path(s).

A minimal bulk latency difference may occur between a latency $\Delta t_{Primary\text{-}Path,k,l}$ in any of the primary paths 101 and a latency $\Delta t_{Secondary\text{-}Path,m,l}$ in the corresponding one of the secondary path 105 in combination with a latency $\Delta t_{ANC\text{-}System}$ of the ANC system according to $$\min(\Delta t_{Primary\text{-}Path,k,l}) \geq \max(\Delta t_{ANC\text{-}System} + \Delta t_{Secondary\text{-}Path,m,l}). \quad (1)$$

In order to compensate for the minimal bulk latency difference, delay elements are employed without compromising on dead times of the ANC filters 103, wherein the ANC systems described herein are causal in order to be able to cancel stochastic signals. Equation (1) implies that the ANC filters 103 can compensate the individual remaining latency for cancelation. But, as is evident, then the ANC filters 103 lose resolution, as the available FIR filter length are filled with leading zeros to mimic the appropriate dead time. The following example illustrates how a compensation delay benefits the feedforward ANC performance, thereby assuming an ANC system that is operated in connection with loudspeakers close to a listener, e.g., headrest loudspeakers:

$\Delta t_{Prim.\text{-}Path}$=8.0 [ms] which was measured;
$\Delta t_{Sec.\text{-}Path}$=0.3 [ms], corresponding to only 30 [cm] between loudspeaker and microphone;
$\Delta t_{ANC.\text{-}System}$=2.0 [ms] (e.g., with an advanced feedforward ANC hardware design).

In such an example situation, in order to meet the causality criteria, the feedforward ANC system needs to compensate a latency difference $\Delta t_{W\text{-}Filter}$:
$\Delta t_{W\text{-}Filter}$=6.7 [ms], which may be equal to, for example, 20 Taps of a FIR filter.

For a practical ANC system, a certain operative sample rate $FS_{ANC}$=4 [kHz] and an ANC filter tap size Total W_FIR_Taps=64 may be assumed. This results in a significant number of "unusable" FIR taps that degenerate the potential ANC performance:

FIR Taps that compensate for causality: 27 (=42%); and
FIR Taps that are usable for noise control: 37 (=58%).

Figure 2:
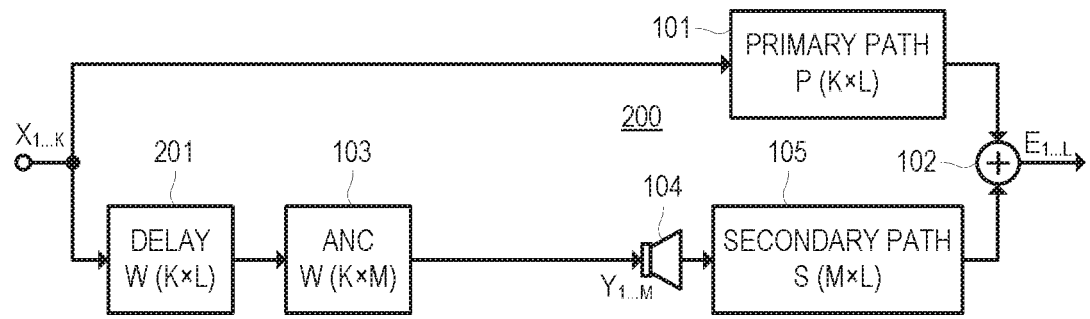
FIG. 2 is a schematic diagram illustrating the noise control system shown in FIG. 1 with a delay that delays a reference signal supplied to the ANC filter.
Figure 3:
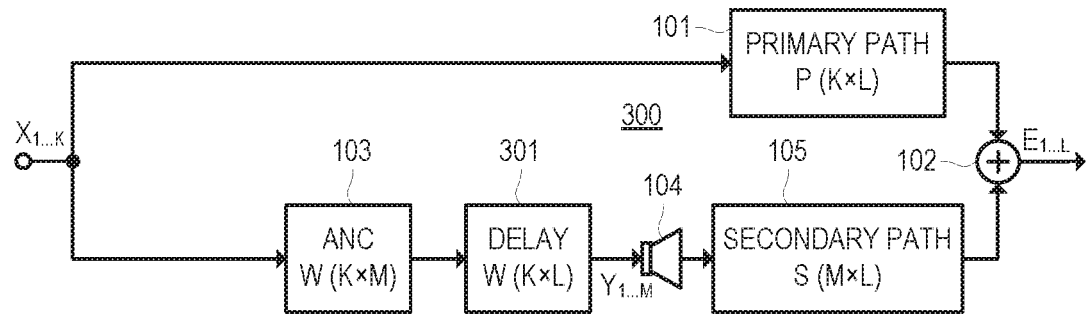
FIG. 3 is a schematic diagram illustrating the noise control system shown in FIG. 1 with a delay that delays a cancelling signal supplied by the ANC filter.
Figure 4:
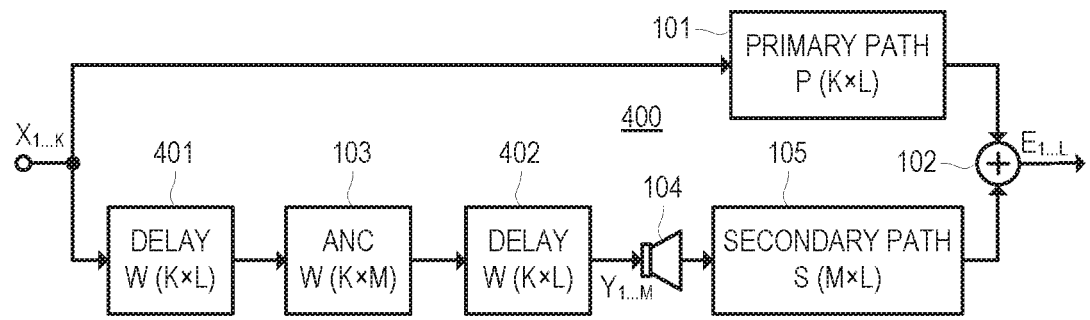
FIG. 4 is a schematic diagram illustrating the noise control system shown in FIG. 1 with a delay that delays a reference signal supplied to the ANC filter and another delay that delays a cancelling signal supplied by the ANC filter.

Here almost half of the feedforward computing power is wasted for latency alignment. To overcome this drawback, in the systems shown in FIGS. 2 to 4, one or more compensation delays are inserted using either a pre-system delay 201 as shown in FIG. 2, a post-system delay 301 as shown in FIG. 3, or system-distributed partial delays 401 and 402 as shown in FIG. 4. In an example system 200 shown in FIG. 2, the pre-system delays 201 are each included in one of the signal paths from the reference sources (not shown), which provide the reference signals $X_{1...K}$, to the ANC filters 103, i.e., the pre-system delays 201 are connected upstream of the ANC filters 103. In an example system 300 shown in FIG. 3, the post-system delays 301 are each included in one of the signal paths from the ANC filters 103 to the loudspeakers 104, i.e., the post-system delays 201 are connected downstream of the ANC filters 103. Because the complete ANC system is assumed to be linear and time invariant, the delays can further be inserted upstream and downstream in partial shares as described in connection with a system 400 shown in FIG. 4, in which partial delays 401 are each included in one of the signal paths from the reference sources (not shown) to the ANC filters 103, and in which partial delays 402 are each inserted in one of the signal paths from the ANC filters 103 to the loudspeakers 104.

A post-system delay can be treated like a modification of the corresponding secondary path. A pre-system delay can be assumed to have no impact to the corresponding secondary path. The latency compensating delays may be implemented not only as latches or registers such as shift registers or first-in first-out registers, but also as, e.g., all-pass filters or linear phase FIR anti-alias filters, as in many ANC systems the target hardware sample rate is a multiple ratio of the ANC system's operating sample rate. Other alternatives for introducing additional latency compensation delays are system loop-backs utilizing, e.g., synchronous or asynchronous sample rate converters. In any event, employing compensation delays requires detailed coherence analysis of the primary path latency in order to estimate the missing bulk delay. Once implemented, the compensation delays significantly increase the ANC system performance in comparison with, for example, systems with short to no secondary paths and short ANC filter lengths.

Figure 5:
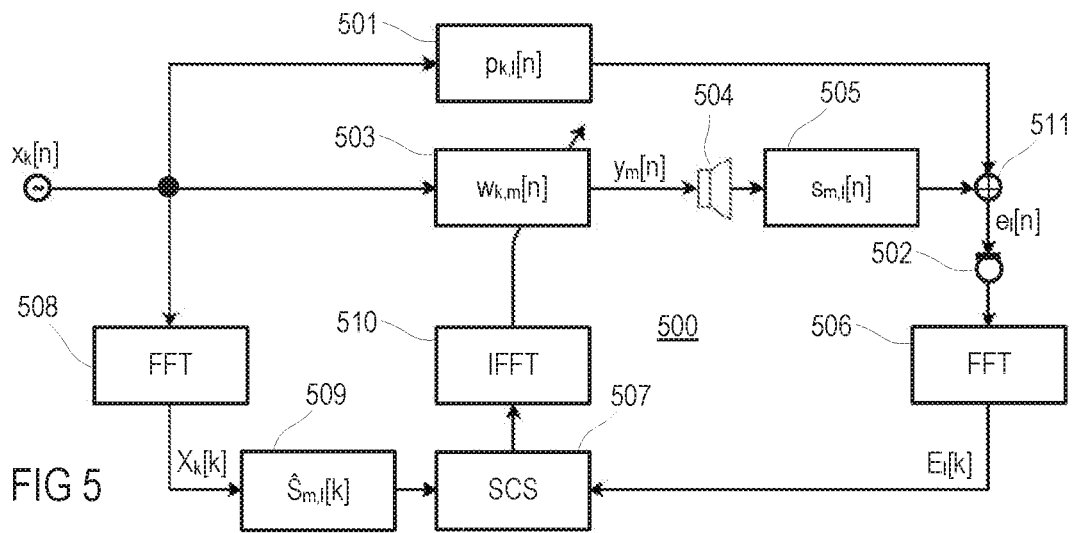
FIG. 5 is a schematic diagram illustrating another multi-channel automatic noise control system of the feedforward type with an ANC filter.

Referring now to FIG. 5, an example feedforward ANC system 500 in which undesired sound is represented by K≥1 time domain reference signals xk[n], wherein k=1, . . . , K and K is an integer, may traverse physical paths, referred to as K·L acoustic primary paths 501, from each of K sources (not shown) of the reference signals xk[n] to each of L≥1 error sensors, e.g., microphones 502, that produce L time domain error signals el[n], wherein l=1, . . . , L and L is an integer. The K·L primary paths 501 have time-domain transfer functions pk,l[n], with which the reference signals xk[n] are filtered. The reference signals xk[n] represent the undesired sound both physically and digitally, wherein a digital representation may be produced by use of an analog-to-digital (A/D) converter. The reference signals xk[n] are also used as inputs to a matrix of K·M adaptive ANC filters 503. The adaptive ANC filters 503 have time domain transfer functions wk,m[n] and may be time domain digital filters such as finite impulse response (FIR) filters or any other appropriate type of filters, each configured to be dynamically adapted to filter a corresponding one of reference signals xk[n] in order to produce M≥1 anti-noise signals ym[n] as an output, wherein m=1, . . . , M and M is an integer. Herein, a discrete time (sample in the time domain) is denoted with an integer [n], frequency bins with an integer [k], and complex frequency with a complex number (z).

The anti-noise signals $y_m[n]$ drive M transducers, e.g., loudspeakers 504, to output corresponding sound waves that travel M·L physical paths, referred to as acoustic secondary paths 505. The secondary paths 505 extend from each of the loudspeakers 504 to each of the microphones 502. The secondary paths 505 in the example system shown in FIG. 5 have time domain transfer functions $s_{m,l}[n]$. The sound waves produced by loudspeakers 504 based on the anti-noise signals ym[n] are filtered with the transfer functions $s_{m,l}[n]$, and then combined (added) with the signals at the outputs of the primary paths 501 to form inputs into the microphones 502 which are represented by L summing nodes 511 (one node 511 per microphone 502). The L summing nodes 511 represent signal superimpositions in the example system shown in FIG. 5, which contribute to the input signals for the microphones 502 to be transformed into the error signals $e_l[n]$.

The error signals $e_l[n]$ output by the microphones 502 are transformed from the time domain into the frequency domain (also known as spectral domain) by way of time-to-frequency domain transformers 506 which provide frequency domain error signals $E_l[k]$. The frequency domain error signals $E_l[k]$ are transmitted to M·L filter controllers 507 which also receive as inputs the reference signals $x_k[n]$ after they have been transformed into frequency domain reference signals $X_k[k]$ and filtered in the frequency domain by a matrix of M·L filters 509. The filters 509 have frequency domain transfer functions $\hat{S}_{m,l}[k]$ and are configured to simulate, estimate or model frequency domain transfer functions $S_{m,l}[k]$ which correspond to the time domain transfer functions $s_{m,l}[n]$ of the secondary paths 505. The filter controllers 507 update the adaptive ANC filters 503 by way of update signals in the frequency domain which are transformed into time domain update signals by way of frequency-to-time domain transformers 510 before they are supplied to the matrix of adaptive ANC filters 503. The adaptive ANC filters 503 receive the undesired time domain reference signals $x_k[n]$ and the time domain update signals and adjust the anti-noise signals $y_m[n]$.

Time-to-frequency domain transformers 506 and 508 may employ fast Fourier transformation (FFT) as shown or any other appropriate time-to-frequency domain transform algorithm including discrete Fourier transformation (DFT) and filter banks. Frequency-to-time domain transformers 510 may employ inverse fast Fourier transformation (IFFT) as shown or any other appropriate frequency-to-time domain transform algorithm. As already mentioned, [n] denotes the $n^{th}$ sample in the time domain and [k] the $k^{th}$ bin in the frequency domain. Further, time domain reference signals $x_k[n]$ are provided within k=1 sample in K reference channels.

The filter controllers 507 may implement one of various possible adaptive control structures, such as least mean squares (LMS), recursive least mean squares (RLMS), normalized least mean squares (NLMS), or any other suitable algorithm. In the example system shown in FIG. 1, the filter controllers 507 employ summed cross spectra which can be used to update the transfer functions of the adaptive ANC filters 503 and which is here used to implement an LMS scheme in the frequency domain. Measurements in the secondary paths are only a snapshot of a given set-up or situation, so they may be treated as estimations and represent a significant contribution to the adaptation process emphasized in the summed cross spectrum. The summed cross spectrum for each combination of m and k can be described as set forth in equation (2):

$$SCS_{k,m}[k] = \Sigma^L_l \mathrm{conj}(X_k[k]\hat{S}_{m,l}[k])E_l[k] \quad (2)$$

Considering this, updating the matrix of K·M time domain transfer functions $w_{k,m}[n]$, e.g., represented by FIR filter taps, can be described as set forth in equations (3) and (4):

$$W_{old,k,m}[k] = FFT\{w_{k,m}[n]\} \quad (3)$$

$$w_{k,m}[n+1] = \quad (4)$$
$$IFFT\left\{\lambda_{k,m}[k] \cdot W_{old,k,m}[k] - \mu_{k,m}[k] \cdot \frac{SCS_{k,m}[k]}{\sqrt{X_k[k]conj(X_k[k])}}\right\}$$

wherein $w_{k,m}[n+1]$ represents an update of the K·M time domain transfer functions $w_{k,m}[n]$; $W_{old,k,m}[k]$ is the matrix of K·M frequency domain transfer functions corresponding to the not-updated time domain transfer functions $w_{k,m}[n]$; $\lambda_{k,m}[k]$ is a matrix of K·M individually tuned, frequency dependent leakage values; $\mu_{k,m}[k]$ is a matrix of K·M individually tuned, frequency dependent adaptation step sizes; and $SCS_{k,m}[k]$ is a matrix of convergence values in the frequency domain representing the summed cross spectrum.

The update mechanism may utilize a normalized filtered-x least mean square (NFXLMS) filter update scheme or routine including normalization by the energy of the reference signal and applying individually tuned frequency depended step-size and leakage. In the following example, it is not distinguished between different types of NFXLMS but the previously described normalization is employed. The normalization applies a reciprocal scaling to the summed cross spectrum by the energy of the reference signal. Hence, the convergence step size automatically adjusts to the energy of the reference signal, allowing an adaptation rate that is as fast as possible, independent of the energy content of the reference signals. Although the normalization already may improve ANC systems, additional techniques may be applied in order to enhance at least one of stability and performance.

One such additional technique is the integration of one or more time delaying elements or processes, referred to as delays, into the signal path including the ANC filter. A delay is understood to be any element or process by which the structure of a signal input into the element or process appears in a signal at the output of the element or process after a certain delay time. The herein described usage of delays is not limited to certain types of delays, including latches, registers, run time elements or filters. Nevertheless, the type of delays used may be restricted in one example to put emphasis on controllable delay times. In this example, delay times may be individually tunable so that the delay times can be adapted to particular secondary paths. One or more delays can be included in the signal flow at various positions. In the examples presented below, only some exemplary positions suitable for time-domain or frequency-domain processing are described. The combination of several delays can be useful, for example, for addressing different causes of delays in the primary and/or secondary paths. Delays here can be very efficient, as memory and computational resources that consume FIR filter taps are not "wasted" by only mimicking the dead time.

Figure 6:
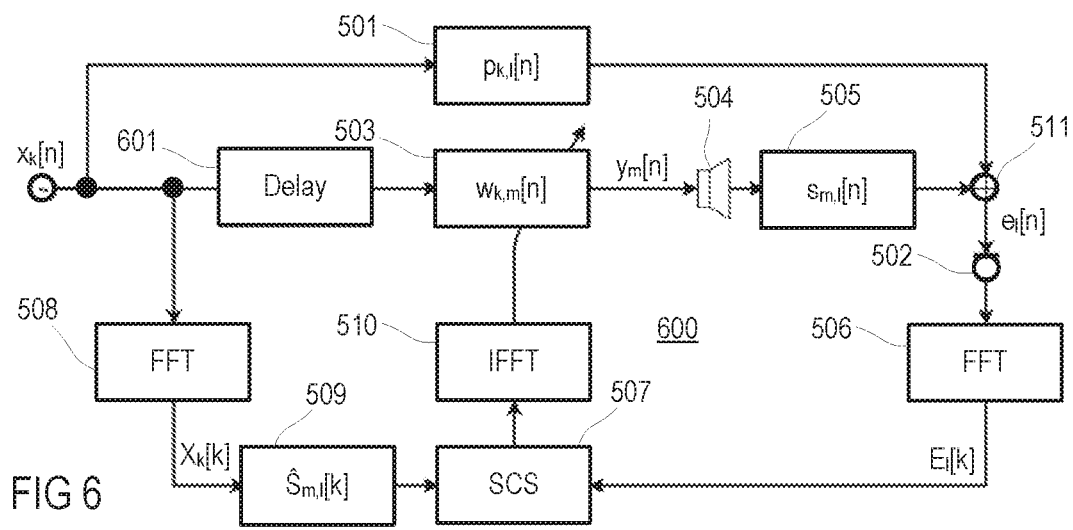
FIG. 6 is a schematic diagram illustrating the noise control system shown in FIG. 5 with a delay that delays a reference signal supplied to the ANC filter.
Figure 7:
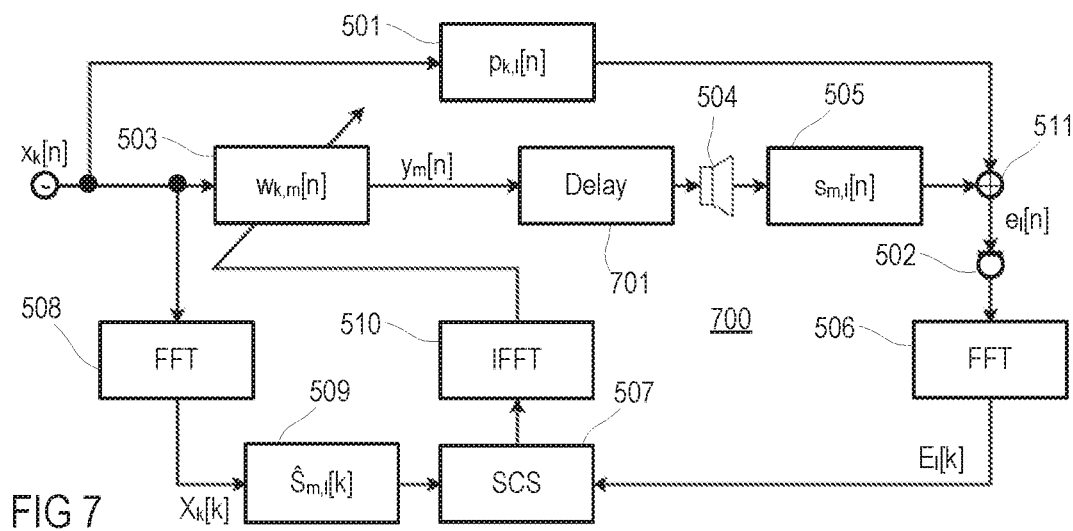
FIG. 7 is a schematic diagram illustrating the noise control system shown in FIG. 5 with a delay that delays a cancelling signal supplied by the ANC filter.

Two example positions within an ANC structure that are configured to delay the reference signal(s) upstream and downstream, respectively, of the adaptive ANC filters 503 are illustrated in FIGS. 6 and 7. In one example ANC system 600 shown in FIG. 6, which is based on the ANC system 500 described above in connection with FIG. 5, a delay element 601 is inserted in input path(s) of adaptive ANC filter(s) 503. In another example ANC system 700 shown in FIG. 7, which is also based on the ANC system 500, a delay element 701 is inserted in output path(s) of adaptive ANC filter(s) 503.

Figure 8:
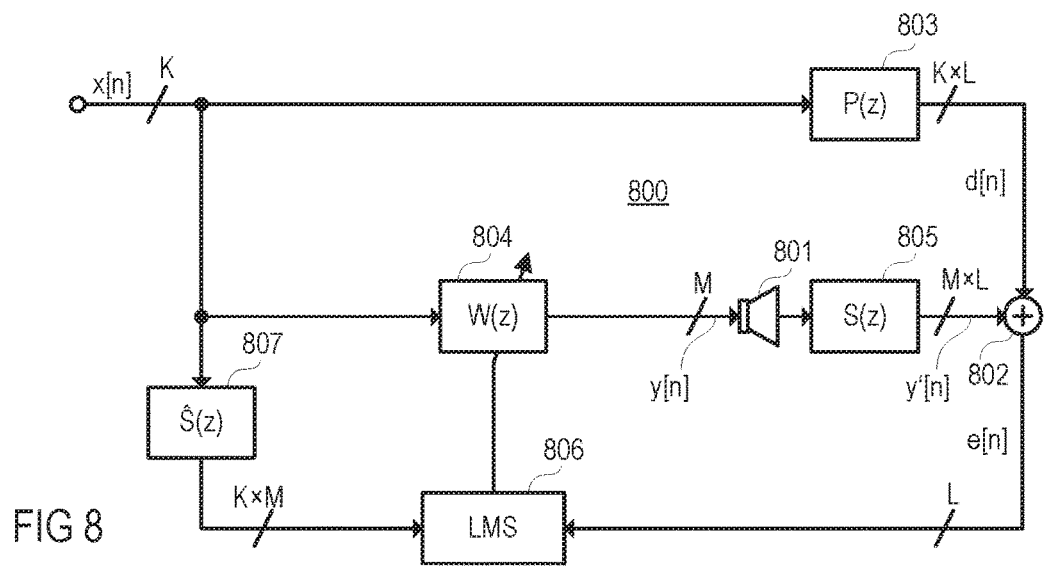
FIG. 8 is a schematic diagram illustrating another multi-channel automatic noise control system of the feedforward type with an ANC filter.

Referring to FIG. 8, a multi-channel ANC system 800 may have M ≥1 output channels for supplying M output signals to M loudspeakers 801 (or groups of loudspeakers) and L≥1 recording channels for receiving L error signals from L microphones 802 (or groups of microphones). A group of loudspeakers includes one or more loudspeakers and a group of microphones includes one or more microphones, wherein each group is connected to a single channel, i.e., one output channel or one recording channel, respectively. It is assumed that the corresponding room or loudspeaker-room-microphone system (a room in which at least one loudspeaker and at least one microphone is arranged) is linear and time-invariant and can be described by, e.g., its room acoustic impulse responses. The ANC system 800 may use a least mean square (LMS) scheme for ANC filtering but may employ any other adaptive control scheme such as a filtered input least mean square (FxLMS) as used in the ANC system 800, recursive least square (RLS), or any other modified LMS algorithm. The LMS algorithm is an iterative algorithm for obtaining the optimum least mean square (LMS) solution. The adaptive approach of the LMS algorithm allows to readjust the ANC filters whenever a change occurs in the electro-acoustic transfer functions of the primary and/or secondary paths.

In one example, a single time domain reference signal x(n) is filtered by K ≥1 primary paths 803, which are represented by a matrix of transfer functions P(z), on its way from one noise source (not shown) to the L microphones 802 at different positions, and provides K·L undesired disturbing signals d[n] at the end of primary paths 803, i.e., at the L microphones 802. In the ANC system 800, time domain adaptive ANC filters 804, which are represented by a matrix of transfer functions W(z), are controlled to modify the reference signals x[n] such that the resulting M output signals supplied to the M loudspeakers 801, and transferred and filtered by ML secondary paths 805, which are represented by a matrix of transfer functions S(z), inversely match, as signals y'[n], the disturbing signals d(n). An ANC filter controller 806 evaluates the reference signal x[n] filtered with secondary pass estimating filters 807, which are represented by a matrix of transfer functions Ŝ(z), and L error signals e[n] from the L microphones 802 to control the ANC filters 804. In FIG. 8, the microphones 802 are represented by summing nodes which sum up the M·L signals y'[n] from the secondary paths 805 and the disturbing signals d[n] from the primary paths 803.

Figure 9:
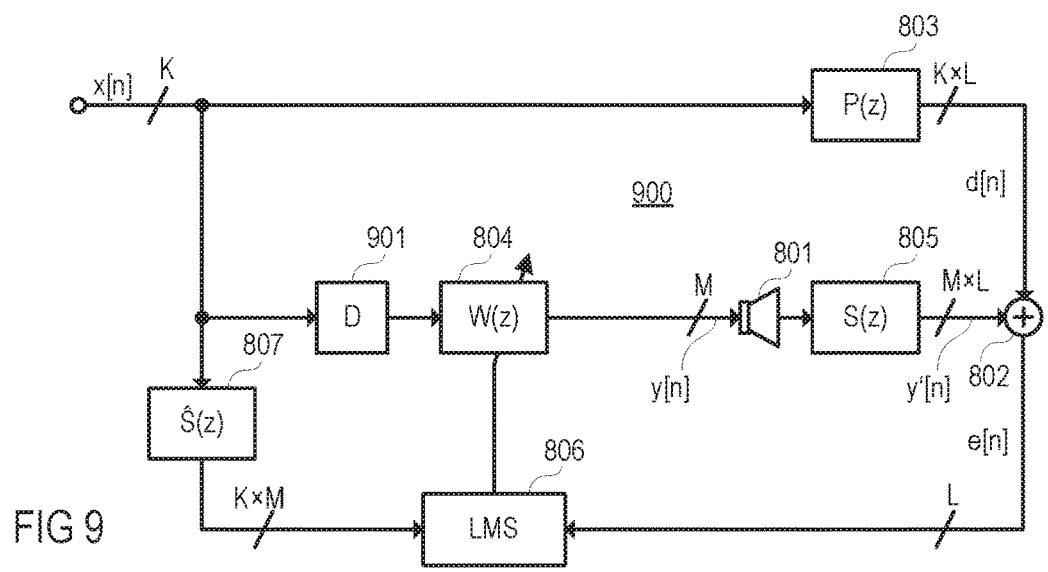
FIG. 9 is a schematic diagram illustrating the noise control system shown in FIG. 8 with a delay that delays a reference signal supplied to the ANC filter.
Figure 10:
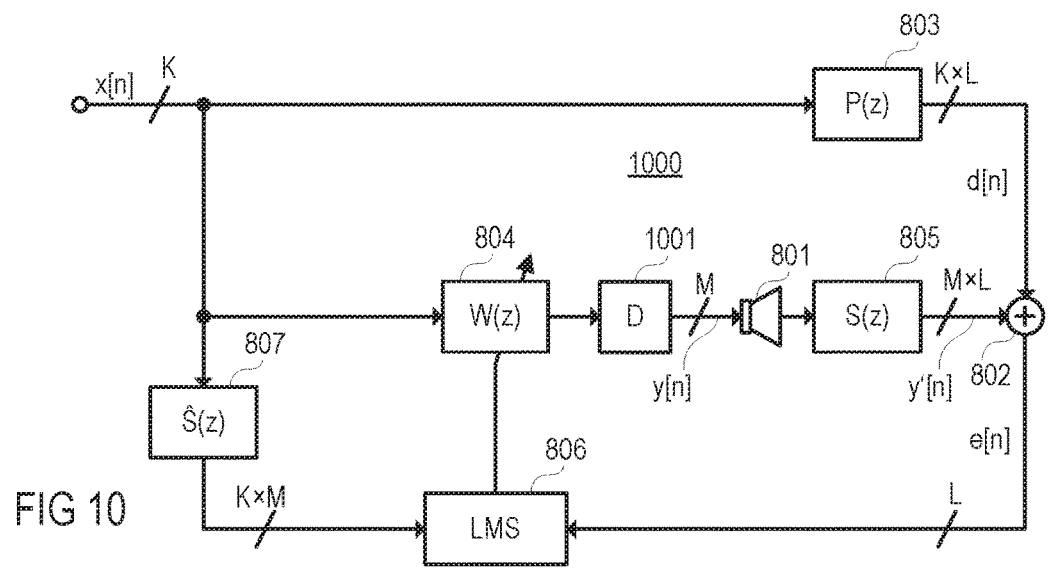
FIG. 10 is a schematic diagram illustrating the noise control system shown in FIG. 8 with a delay that delays a cancelling signal supplied by the ANC filter.

Two example positions within the ANC structure 800 that are configured to delay the reference signal x[n] upstream and downstream, respectively, of the adaptive ANC filters 804 are illustrated in FIGS. 9 and 10. In one example ANC system 900 shown in FIG. 9, which is based on the ANC system 800 described above in connection with FIG. 8, a delay element 901 is inserted in the input path(s) of adaptive ANC filter(s) 804. In another example ANC system 1000 shown in FIG. 10, which is also based on the ANC system 800, a delay element 1001 is inserted in output path(s) of adaptive ANC filter(s) 804.

Figure 11:
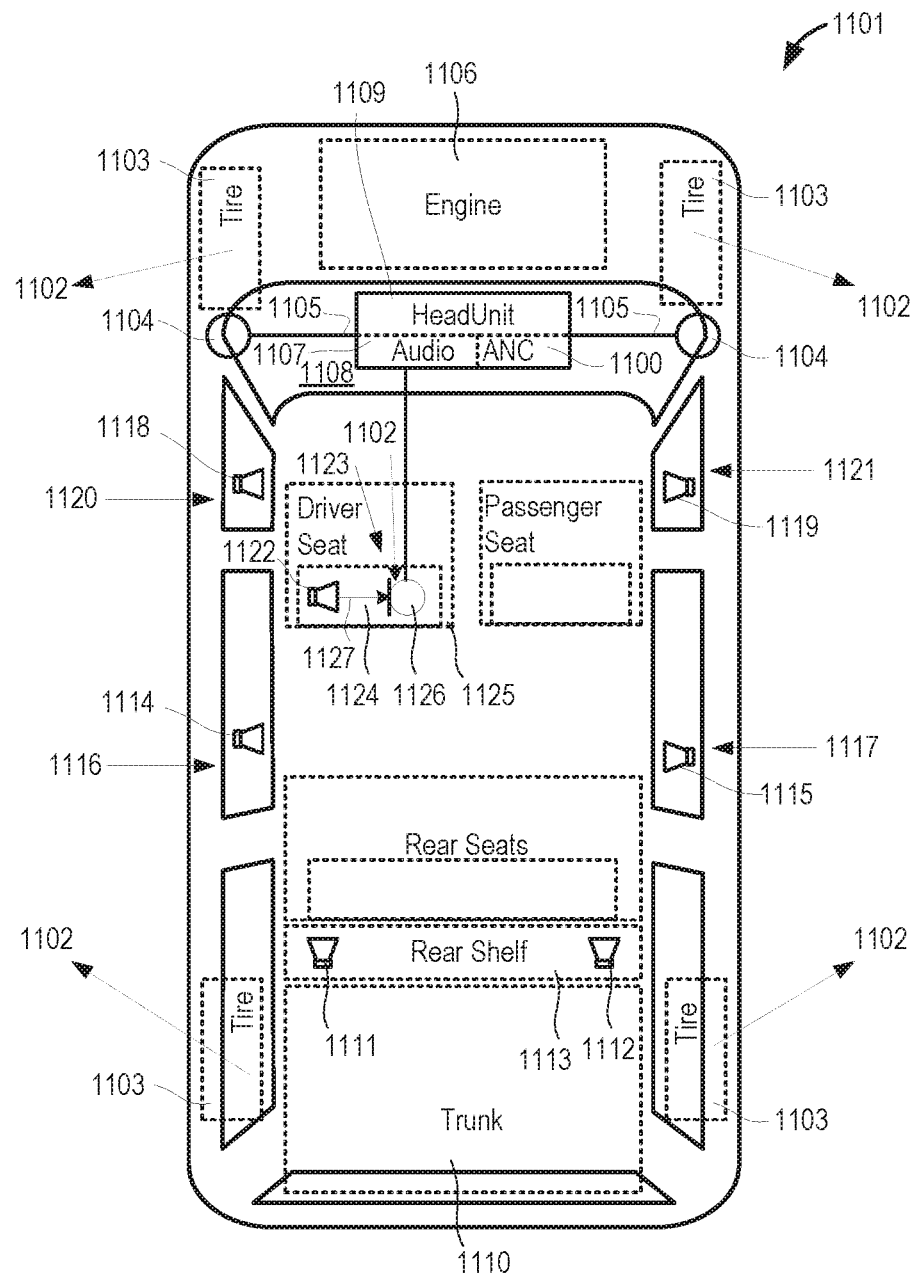
FIG. 11 is a top view of an example vehicle implementing an example ANC system such as the systems shown in FIGS. 1 to 10.

Referring to FIG. 11, an example ANC system 1100, which may be identical or similar to any of ANC systems 200, 300, 400, 600, 700, 900 and 1000 shown in FIGS. 2, 3, 4, 6, 7, 9 and 10 may be implemented in an example vehicle 1101, is shown. In one example, the ANC system 1100 may be configured to reduce or eliminate undesired sounds associated with the vehicle 1101. For example, the undesired sound may be road noise 1102 (represented in FIG. 11 as a dashed arrow) associated with, for example, tires 1103. However, various undesired sounds may be targeted for reduction or elimination such as engine noise or any other undesired sound occurring in or associated with the vehicle 1101. The road noise 1102 may be detected through at least one reference sensor that provides at least one reference signal. In one example, the at least one reference sensor may be two accelerometers 1104, which may generate road noise signals 1105, which serve as reference signals for the ANC system 1100, based on a current operating condition of the tires 1103 and indicative of the level of the road noise 1102. Other manners of sound detection may be implemented, such as microphones, non acoustic sensors, or any other sensors suitable for detecting audible sounds associated with the vehicle 1101, e.g., the tires 1103 or an engine 1106.

The vehicle 1101 may contain various audio/video components. In FIG. 11, the vehicle 1101 is shown as including an audio system 1107, which may include various devices for providing audio/visual information, such as an AM/FM radio, CD/DVD player, mobile phone, navigation system, MP3 player, or personal music player interface. The audio system 1107 may be embedded in the dash board 1108, e.g., in a head unit 1109 disposed therein. The audio system 1107 may also be configured for mono, stereo, 5-channel, and 7-channel operation, or any other audio output configuration. The audio system 1107 may include a plurality of loudspeakers in the vehicle 1101. The audio system 1107 may also include other components, such as one or more amplifiers (not shown), which may be disposed at various locations within the vehicle 1101 such as a trunk 1110.

In one example, the vehicle 1101 may include a plurality of loudspeakers, such as a left rear loudspeaker 1111 and a right rear loudspeaker 1112, which may be positioned on or within a rear shelf 1113. The vehicle 1101 may also include a left side loudspeaker 1114 and a right side loudspeaker 1115, each mounted within a vehicle rear door 1116 and 1117, respectively. The vehicle 1101 may also include a left front loudspeaker 1118 and a right front loudspeaker 1119, each mounted within a vehicle front door 1120, 1121, respectively. The vehicle 1101 may also include a headrest loudspeaker 1122 positioned within or at a head rest 1124 of a driver seat 1125. In other examples, other configurations of the audio system 1107 in the vehicle 1101 are possible. For example, two or more loudspeakers may be disposed in or at the headrest 1124. Additionally or alternatively, one or more loudspeaker may be disposed in or at one or more other headrests in the vehicle 1101. Additionally or alternatively, one or more loudspeakers and/or one or more microphones may be disposed close to the headrests such as in or on the seat, roof liner or pillar.

In one example, the headrest loudspeaker 1122 may be used, similar to speaker(s) 104, 504 and 801 in the systems shown in FIGS. 1 to 10, to transmit anti-noise to reduce road noise 1102 that may be heard in a target space 1123. In one example, the target space 1123 may be an area proximate to a driver's ears, e.g., be proximate to the head rest 1124 of the driver seat 1125. In FIG. 7, an error sensor such as a microphone 1126 may be disposed in, at or adjacent to the head rest 1124. The microphone 1126 may be connected to the ANC system 1100 in a manner similar to microphone(s) 102, 502 and 802 described in connection with FIGS. 1 to 10. In FIG. 11, the ANC system 1100 and audio system 1107 are connected to the headrest loudspeaker 1122, so that signals generated by the audio system 1107 and the ANC system 1100 may be combined to drive headrest loudspeaker 1122 and produce a loudspeaker output 1127 (represented as dashed arrow). This loudspeaker output 1127 may be produced as a sound wave so that the anti-noise destructively interferes with the road noise 1102 in the target space 1123. One or more other loudspeakers in the vehicle 1101 may be selected to produce a sound wave that includes cancelling sound, i.e., anti-noise. Furthermore, the microphone 1126 may be placed at various positions throughout the vehicle in one or more desired target spaces.

As can be seen from FIG. 11, the ANC system is intended to produce sound that destructively interferes with undesired sound. The undesired sound may be, e.g., road noise or engine noise generated by a vehicle traveling down a road. At the same time it is intended to produce other sound that is considered desirable by a user sitting in the vehicle such as, for example, a song or speech on a radio for the user's enjoyment. Thus, the ANC system generates (e.g., in connection with an audio system that generates the desired sound) sound to destructively interfere with the undesired road noise. The desired audio signal is received by one or more loudspeakers such as headrest loudspeaker 1122 to produce the desired sound in the target space. The desired sound, however, may be transmitted to the reference sensor, e.g., accelerometer 1104 and/or to the error sensor, e.g., microphone 1126, and generate signal components in the reference signal and/or the error signal that refer back to the audio signal, and which are not to be cancelled.

Figure 12:
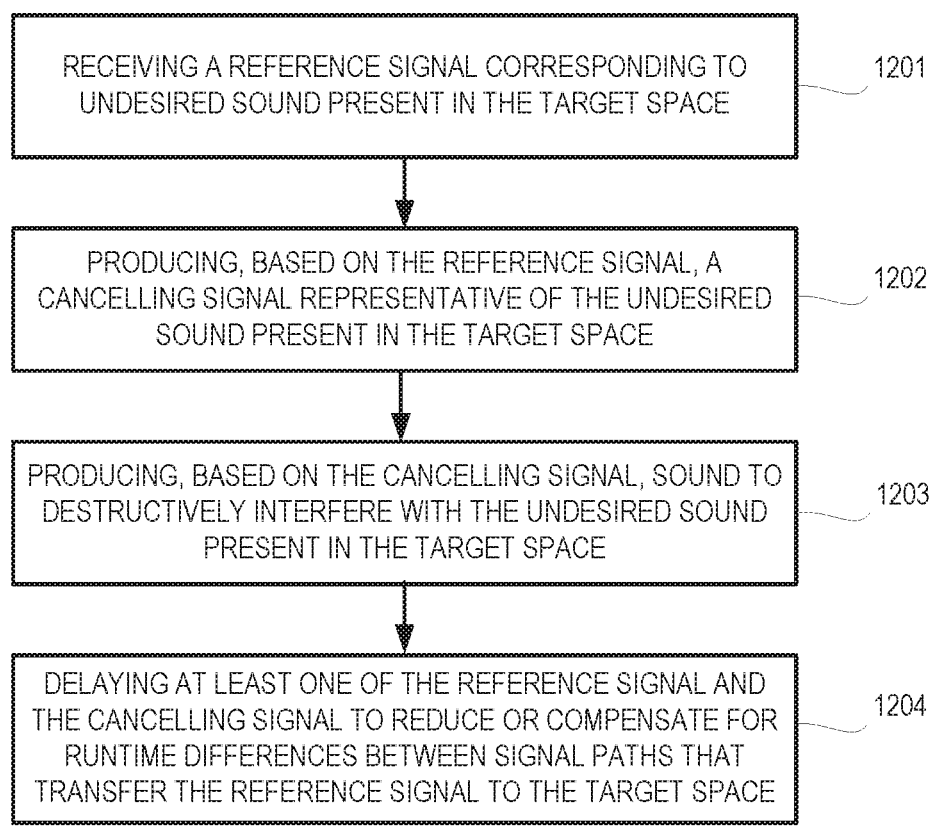
FIG. 12 is a flow chart illustrating an exemplary ANC method.

Referring to FIG. 12, an exemplary ANC method includes receiving a reference signal corresponding to undesired sound present in a target space (procedure 1201), and producing, based on the reference signal, a cancelling signal representative of the undesired sound present in the target space (procedure 1202). The method further includes producing, based on the cancelling signal, sound to destructively interfere with the undesired sound present in the target space (1203), and delaying at least one of the reference signal and the cancelling signal to reduce or compensate for runtime differences between signal paths that transfer the reference signal to the target space (procedure 1204).

The embodiments of the present disclosure generally provide for a plurality of circuits, electrical devices, and/or at least one controller. All references to the circuits, the at least one controller, and to other electrical devices, as well as the functionality provided by each of these, are not intended to be limited to encompass only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

It is recognized that any computer, processor and controller as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any controller as disclosed utilizes any one or more microprocessors to execute a computer-program that is embodied in a non-transitory computer readable medium that is programmed to perform any number of the functions as disclosed. Further, any controller as provided herein includes a housing and the various number of microprocessors, integrated circuits, and memory devices (e.g., FLASH, random access memory (RAM), read only memory (ROM), electrically programmable read only memory (EPROM), electrically erasable programmable read only memory (EEPROM)) positioned within the housing. The computer(s), processor(s) and controller(s) as disclosed also include hardware based inputs and outputs for receiving and transmitting data, respectively from and to other hardware based devices as discussed herein.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature, and may include additional elements and/or omit elements.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

The invention claimed is:

1. An automatic noise control system comprising:
a reference input path configured to receive a reference signal corresponding to undesired sound present in a target space;
an active noise controller operatively coupled with the reference input path and configured to produce from the reference signal a cancelling signal for cancelling undesired sound present in the target space;
a transducer operatively coupled with the active noise controller and configured to produce, based on the cancelling signal, sound to destructively interfere with the undesired sound present in the target space; and
at least two delay elements each operatively coupled upstream and downstream, respectively, of the active noise controller and configured to delay at least one of the reference signal and the cancelling signal to reduce runtime differences between one or more signal paths that transfer the undesired sound and one or more signal paths that transfer the reference signal to the target space.

2. The system of claim 1, further comprising an error sensor configured to produce an error signal representative of sound present in the target space; wherein:
the active noise controller comprises an adaptive filter and a filter controller;
the adaptive filter configured to receive the reference signal and to provide the cancelling signal by filtering the reference signal with a controllable transfer function; and
the filter controller configured to receive the reference signal and the error signal, and to control the transfer function of the adaptive filter according to an adaptive control scheme based on the reference signal and the error signal.

3. The system of claim 2, wherein a secondary path modelling filter is operatively coupled with the active noise controller to pre-filter the reference signal before the reference signal is received by the active noise controller, the secondary path modelling filter having a transfer function that is an estimate of a transfer function of an acoustic secondary path between the transducer and the error sensor.

4. The system of claim 2, wherein the adaptive filter is operated in a time domain and the filter controller is operated in a frequency domain.

5. The system of claim 4, wherein the adaptive control scheme of the filter controller employs a summed cross spectrum scheme.

6. The system of claim 2, wherein the adaptive filter and the filter controller are operated in a time domain.

7. The system of claim 6, wherein the adaptive control scheme of the filter controller employs a least mean square scheme.

8. The system of claim 1, wherein the at least two delay elements are one of a latch, register, run time element or filter.

9. The system of claim 8, wherein the at least two delay elements are a shift register.

10. The system of claim 8, wherein the at least two delay elements comprise at least one of a linear phase finite impulse response filter and an all-pass filter.

11. A sound reduction method comprising:
receiving a reference signal corresponding to undesired sound present in the target space;
producing, based on the reference signal, a cancelling signal representative of the undesired sound present in the target space;
producing, based on the cancelling signal, sound to destructively interfere with the undesired sound present in the target space; and
delaying at least one of the reference signal and the cancelling signal via at least two delay elements operatively coupled with upstream and downstream respectively, of an active noise controller, to reduce runtime differences between one or more signal paths that transfer the undesired sound and one or more signal paths that transfer the reference signal to the target space.

12. The method of claim 11, further comprising:
producing an error signal representative of sound present in a target space;
adaptive filtering configured to receive the reference signal and to provide the cancelling signal by filtering the reference signal with a controllable transfer function; and
controlling the transfer function configured to receive the reference signal and the error signal, and to control the transfer function of the adaptive filtering according to an adaptive control scheme based on the reference signal and the error signal.

13. The method of claim 12, further comprising secondary path modelling filtering to pre-filter the reference signal before the reference signal is received by the active noise controller, the secondary path modelling filtering being based on a transfer function that is an estimate of a transfer function of an acoustic secondary path between the transducer and the error sensor.

14. The method of claim 12, wherein the adaptive filtering is performed in a time domain and controlling the transfer function of the adaptive filtering is performed in a frequency domain.

15. The method of claim 14, wherein the adaptive control scheme for controlling the transfer function of the adaptive filtering employs a summed cross spectrum scheme.

16. The method of claim 14, wherein the adaptive control scheme for controlling the transfer function of the adaptive filtering employs a least mean square scheme.

17. The method of claim 11, wherein the delaying is performed with one of a latch, register, run time element or filter.

18. The method of claim 17, wherein the delaying is performed with a shift register.

19. The method of claim 17, wherein the delaying is performed with at least one of a linear phase finite impulse response filter and an all-pass filter.

20. A computer-readable storage medium comprising instructions which, when executed by a computer, cause the computer to carry out the method of claim 11.

* * * * *